Nov. 3, 1953
H. W. BALLEW ET AL
2,657,752
MAGNETIC FISHING TOOL
Filed March 31, 1949
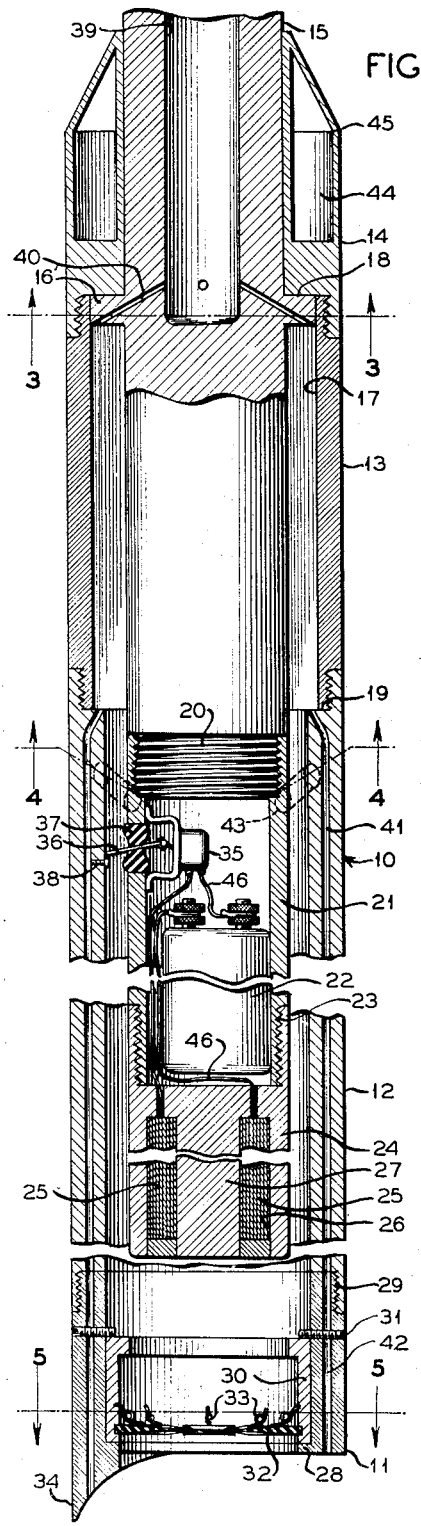
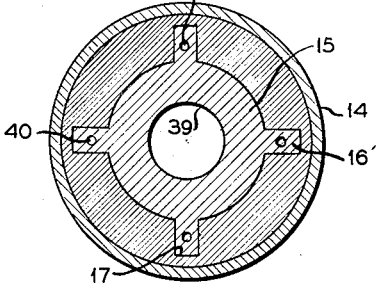
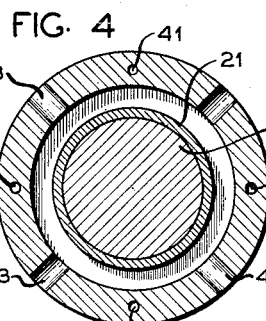
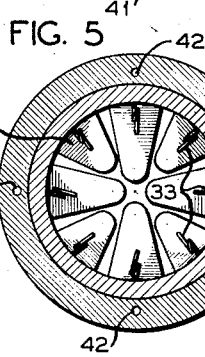
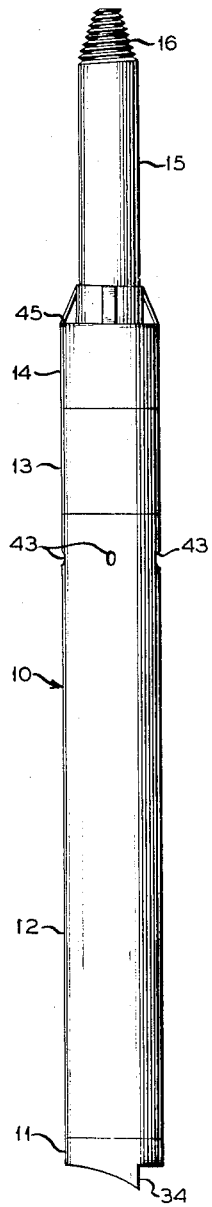
INVENTORS
H. W. BALLEW
J. R. BALLEW
BY
A. Yates Dowell
ATTORNEY Patented Nov. 3, 1953

2,657,752

UNITED STATES PATENT OFFICE 2,657,752

MAGNETIC FISHING TOOL

Harold W. Ballew, Lubbock, Tex., and Julius R. Ballew, Hobbs, N. Mex.

Application March 31, 1949, Serial No. 84,616

6 Claims. (Cl. 166—19)

This invention relates to well machinery and more particularly to a magnetic fishing tool for recovering metallic objects such as parts of drills or the like which may become detached from their associated apparatus or otherwise be lost at the bottom of a well, such as an oil well or other relatively deep bore in the ground.

Heretofore numerous attempts have been made to provide magnetic fishing tools but these have not enjoyed any great degree of success, largely due to the fact that no efficient means has been provided for removing foreign material such as rock cuttings, mud or the like in the bottom of the well, or for moving the metallic objects toward the center of the well where it might be conveniently engaged and picked up by the fishing tool. Further, many of these prior art tools have attempted to retain the retrieved objects by magnetic force alone until removed to the surface with the result that the objects were frequently dislodged therefrom in the elevating operation necessitating repeating the operation until successful removal was accomplished.

It is accordingly an object of this invention to provide a self-contained magnetic fishing tool which may be attached to the conventional drill string in which there is provided a relatively powerful electromagnet and self-contained power supply therefor which is automatically turned off and on during the operation of the tool and further in which means is provided for receiving and holding the metallic object after engagement therewith by the electromagnet.

It is a further object of this invention to provide a magnetic fishing tool in which means is provided to permit the circulation of mud or other fluid whereby the rock cuttings or the like present at the bottom of the well may be removed in order to permit easy access to the metallic objects which it is desired to recover, the tool also incorporating means whereby upon rotation thereof metallic objects present in the bottom of the well will be moved toward the center for convenient engagement by the electromagnet.

It is a further object of the invention to provide a magnetic fishing tool of relatively simple and economical construction in which all of the electrical parts are efficiently sealed against the entrance of moisture and further a tool which is completely automatic in operation in that it is only necessary to lower the same into a well and supply mud or other fluid thereto after which the tool will operate to retrieve metallic objects present in the bottom of the well.

Further objects and advantages of the invention will be apparent from the following description taken in conjunction with the accompanying drawings, wherein:

Fig. 1 is a view in elevation showing the magnetic fishing tool of this invention;

Fig. 2, a sectional view drawn to an enlarged scale in order to more clearly show the internal arrangement of parts;

Fig. 3, a sectional view on the line 3—3 of Fig. 2;

Fig. 4, a sectional view on the line 4—4 of Fig. 2; and

Fig. 5, a sectiinal view on the line 5—5 of Fig. 2.

With continued reference to the drawing, there is shown in Figs. 1 and 2 a magnetic fishing tool having a hollow body 10 comprising a basket supporting section 11, an intermediate section 12, a splined section 13 and a junk basket section 14. As shown in Fig. 2, these sections are threadedly secured together to form the hollow body 10 which receives the remaining parts of the tool.

Slidably disposed in the sections 13 and 14 is an axially extending rod 15 provided at the upper end thereof with tapered threads 16 for reception in the end of a conventional drill string whereby the fishing tool may be conveniently secured thereto. Rod 15 is provided with a plurality of projections or splines 16' which slidably engage grooves or splines 17 in the splined section 13 and the junk basket section 14 has an inwardly extending shoulder 18 which engages the projections 16 to limit outward movement of the rod 15. The inter-engaging splines and grooves 16' and 17 also serve to prevent relative rotation between body 13 and rod 15. Similarly the intermediate section 12 is provided with an inwardly extending shoulder 19 for engagement with the projection 16' to limit inward movement of the rod 15. It will therefore be seen from an inspection of Fig. 2 that the rod is permitted to slide within the body of the tool a distance substantially equal to the length of the spline section 13.

The lower end of rod 15 is provided with a screw threaded section 20 for the reception of a battery container 21 which may be in the form of a hollow tubular member of a size sufficient to receive a battery 22. This battery may be either of the wet or dry type or if desired may be replaced by wires leading upwardly to the surface of the well, the electrical power being supplied from any convenient means.

The lower end of battery container 21 is provided with a screw threaded portion 23 for receiving an electromagnet 24 having a coil 25 positioned in a recess 26 and surrounding a central pole piece 27. The function and operation of this electromagnet will be hereinafter more fully described.

The basket supporting section 11 is provided adjacent the bottom thereof with an inwardly extending flange 28, the upper end of this section being secured to the intermediate section by screw threads or the like, 29. A basket 30 of generally cylindrical construction is rotatably mounted in the basket supporting section 11 in engagement with the flange 28 and upward movement of the basket relative to the basket carrying section is prevented by set screws or the like 31 projecting inwardly through the section 11 to overlie the upper edge of the basket 30.

The basket 30 is provided adjacent the lower end thereof with a plurality of inwardly extending flexible fingers 32 which may be formed of rubber or other equivalent non-metallic material. These fingers are secured in the inner wall of the basket 30 and normally occupy a horizontal position as shown in Figs. 2 and 5 substantially closing the lower end of the basket 30. These fingers 32 are urged toward horizontal closing position by spring elements 33 secured in the inner wall of the basket 30, these spring elements being preferably formed of non-magnetic material. The fingers 32 are so constructed that they may easily swing upwardly as viewed in Fig. 2 to permit the entry of objects into the basket and after passage between the fingers they will return to horizontal position under the action of springs 33 to retain objects in the basket.

The basket carrying section 11 is also provided with an axially extending tooth 34 adjacent the circumference thereof, the function and operation of which will be presently described.

The operation of the electromagnet 24 is automatically controlled by a switch 35 mounted within the battery container 21, there being an actuating member 36 secured to the switch 35 and extending through the wall of the battery container 21. Actuating member 36 is sealed in a plug 37 of rubber or other suitable resilient material sealed in the wall of the container which permits movement thereof relative to the wall of the battery container 21 and the switch 35 but at the same time prevents entrance of moisture into the battery compartment. The switch actuating member 36 is so proportioned as to engage a projection 38 on the inner wall of intermediate section 12, this projection being in the form of a screw, rivet or the like and serving to operate the actuating member 36 upon reciprocating movement of the rod 15 and associated battery container 21 and electromagnet 24.

In order to clear away rock cuttings and the like which may be present in the bottom of the well and covering metallic objects to be retrieved, the rod 15 is provided with a bore 39 terminating adjacent the splines or projections 16' there being provided a plurality of radially disposed downwardly extending passageways 40 communicating with the bore 39 and the space below the splines 16' and the inner wall of the spline section 13. The intermediate section 12 is provided with a plurality of axially extending passages 41 in the wall thereof, these passages extending from the space in the splined section 13 through axially extending mating passages 42 in the basket carrying section 11 to the lower edge of this section. Bore 39, passages 40, 41 and 42 permit mud or other fluid to be pumped downwardly through the drill string and to be ejected with some force from the lower edge of the basket carrying section 11. These jets serve to wash away accumulated rock cuttings and the like and to expose the metallic objects to be retrieved for convenient engagement by the fishing tool. The circulated mud or other fluid is discharged from the bottom of the well around the outside of the body 10 and upwardly through the basket 30 and the space between the electromagnet 24, battery container 21 and the inner wall of intermediate section 12. The circulated fluid is discharged from this space through upwardly extending radially disposed passages 43 in the wall of intermediate section 12 adjacent the upper end thereof.

As the circulated fluid passes upwardly in the well around the outside of the fishing tool relatively heavy particles of foreign material may be carried thereby and in order to retrieve these particles the junk basket section 14 is provided with a receptacle 44 having an open top 45 into which these heavier particles may pass to be retained therein until withdrawal of the tool to the surface.

In operation the fishing tool is lowered into a well or other opening from which it is desired to remove metallic objects until the lower edge of the basket carrying section 11 contacts the bottom thereof. At this time the tool is slowly rotated and mud or other fluid is pumped through the passages as above described to clear away rock cuttings and the like and expose the metallic objects in the bottom of the well. The rotation of the single tooth 34 will cause this tooth to engage such metallic objects and move the same toward the center of the well where they may be conveniently engaged by the tool.

As will be seen from an inspection of Fig. 2, upon contact of the lower edge of the tool with the bottom of the well downward movement of the body 10 will cease but the rod 15, battery container 21 and electromagnet 24 will continue to move downwardly until the splines 16' contact the shoulder 19 upon the upper end of intermediate section 12, at which time the lower surface of the electromagnet 24 will be positioned immediately above the basket 30. Also, during this downward movement of the rod and associated parts relative to the body 10, switch 35 will be closed by engagement of the actuating member 36 with the projection 38 to energize the electromagnet 24 through leads 46 connected between the battery 22, switch 35 and coil 25 of the magnet.

The magnet 24 is sufficiently powerful to lift any metallic objects from the bottom of the well into the basket 30, this operation causing the upward movement of inwardly extending fingers 32, the object being lifted well above the extremities of these fingers when so raised. After the object passes fingers 32, these fingers will be returned to their original horizontal position substantially closing the open end of the basket. Rotation of the tool may then be stopped and the same raised, which action will first cause a relative upward movement between rod 15, battery container 21 and electromagnet 24, the switch actuating member 36 thus engaging projection 38 to deenergize the electromagnet 24, thus releasing any metallic objects attached thereto, which objects will drop into the basket 30 to be retained therein until reaching the surface. Likewise any objects which have been deposited in the junk basket 44 will also be retained until reaching the surface.

It will be seen that by the above described invention there has been provided a relatively simple magnet fishing tool which only depends on magnetic force to lift the metallic objects from the bottom of the well into a retaining basket, after which these objects are retained therein without necessity for maintaining the magnet energized until the surface is reached. This tool likewise provides means for removing the rock cuttings or the like and exposing the metallic objects for convenient contact by the tool and since the device is entirely self-contained it is only necessary to attach the same to a conventional drill string and after recovery of the desired objects from the bottom of the well the tool may easily be removed and a drill installed in place thereof.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A magnetic fishing tool for recovering metallic objects from the bottom of a well or the like comprising a cylindrical hollow body, a shaft slidably and non-rotatably mounted in said body and extending from the upper end thereof, an electromagnet and a battery container secured to the lower end of said shaft within said body, a switch in said battery container having an actuating element extending through the wall thereof, electric connections between said magnet, said switch and a battery in said container, a basket rotatably mounted within said body adjacent the lower end thereof, resilient non-metallic fingers extending radially inwardly from the wall of said basket and substantially closing one end thereof, non-magnetic spring means engaging the upper surface of said resilient fingers and serving to bias said fingers toward closing position, inlet passages extending through said shaft and the side wall of said body to the lower edge thereof whereby fluid may be passed therethrough and ejected downwardly from said body to remove material from the bottom of said well in which said objects may be buried, outlet passages in said body whereby said fluid and material may pass upward within said body around said magnet and battery container and out through said outlet passages, a single tapered tooth extending axially from the lower edge of said body whereby upon rotation of said tool objects engaged by said tooth will be moved toward the axis thereof and a projection within said body in the path of movement of said actuating element whereby upon downward movement of said shaft, battery container and magnet relative to said body said actuating element will engage said projection to actuate said switch and energize said magnet thus lifting said objects through said fingers into said basket and whereby upon upward relative movement of said shaft, battery container and magnet, said actuating element will engage said projection to actuate said switch and deenergize said magnet thus releasing said objects to deposit the same in said basket to be retained therein by said fingers until reaching the surface.

2. A magnetic fishing tool for recovering metallic objects from the bottom of a well or the like comprising a cylindrical hollow body, a shaft slidably and non-rotatably mounted in said body and extending from the upper end thereof, an electromagnet secured to the lower end of said shaft within said body, a switch secured in fixed relation to said magnet, electrical connections between said magnet, said switch and a source of current, a basket mounted within said body adjacent the lower end thereof, resilient fingers extending radially inwardly from the wall of said basket and substantially closing one end thereof, spring means engaging said resilient fingers and serving to bias said fingers toward closing position, inlet passages extending through said shaft and the side wall of said body to the lower edge thereof whereby fluid may be passed therethrough and ejected downwardly from said body to remove material from the bottom of said well in which said objects may be buried, outlet passages in said body whereby said fluid and material may pass upwardly within said body around said magnet and battery container and out through said outlet passages, a single tapered tooth extending axially from the lower edge of said body whereby upon rotation of said tool objects engaged by said tooth will be moved toward the axis thereof and means within said body for actuating said switch upon downward movement thereof relative to said body to energize said magnet thus lifting said objects through said fingers into said basket and whereby upon upward relative movement of said switch relative to said body said switch will be actuated to deenergize said magnet thus releasing said objects to deposit the same in said basket to be retained therein by said fingers until reaching the surface.

3. A magnetic fishing tool for recovering metallic objects from the bottom of a well or the like comprising a cylindrical hollow body, a shaft slidably and non-rotatably mounted in said body and extending from the upper end thereof, an electromagnet secured to the lower end of said shaft within said body, a switch secured in fixed relation to said magnet, electric connections between said magnet, said switch and a source of current, a basket mounted within said body adjacent the lower end thereof, resilient fingers extending radially inwardly from the wall of said basket and substantially closing one end thereof, inlet passages extending through said shaft and the side wall of said body to the lower edge thereof whereby fluid may be passed therethrough and ejected downward from said body to remove material from the bottom of the well in which said objects may be buried, outlet passages in said body whereby said fluid and material may pass upwardly within said body around said magnet and out through said outlet passages, means within said body for actuating said switch upon downward movement thereof relative to said body to energize said magnet thus lifting said objects through said fingers into said basket said means also serving upon upward movement of said switch relative to said body to actuate the same to deenergize said magnet thus releasing said objects to deposit the same in said basket to be retained therein by said fingers until reaching the surface.

4. A magnetic fishing tool for recovering metallic objects from the bottom of a well or the like comprising a cylindrical hollow body, a shaft slidably and non-rotatably mounted in said body and extending from the upper end thereof, an electromagnet secured to the lower end of said shaft within said body, a source of current for said magnet, a basket mounted within said body adjacent the lower end thereof, movable fingers extending radially inwardly from the wall of said basket and substantially closing one end thereof, means operable by downward movement of said magnet relative to said body to connect said source of current to said magnet to energize the same thus lifting said objects through said fingers into said basket, said means also being operable by upward movement of said magnet relative to said body to disconnect said source of current from said magnet to deenergize the same thus releasing said objects to deposit the same in said basket to be retained by said fingers until reaching the surface.

5. A device as defined in claim 2 in which said basket is mounted within said body by a section of said body threadedly attached to the remainder thereof thus facilitating removal of said basket and the contents thereof.

6. A magnetic fishing tool for recovering metallic objects from the bottom of a well or the like, comprising a hollow body, a shaft reciprocable within said body and extending from the upper end thereof, an electromagnet secured to the lower end of said shaft within said body, a source of current for said magnet, a basket mounted within said body adjacent the lower end thereof below said magnet, means to permit entry of objects into said basket and to prevent inadvertent removal thereof, means operable by downward movement of said magnet relative to said body to connect said source of current to said magnet to energize the same and attract metallic objects in the well and upon upward movement relative to said body to withdraw said objects into said basket for removal to the surface.

HAROLD W. BALLEW.
JULIUS R. BALLEW.

References Cited in the file of this patent

UNITED STATES PATENTS

| Number | Name | Date |
|---|---|---|
| 1,439,687 | Brandon | Dec. 26, 1922 |
| 1,589,678 | Bornemann | June 22, 1926 |
| 2,092,316 | Lane | Sept. 7, 1937 |
| 2,159,249 | Brantly | May 23, 1939 |
| 2,318,885 | Osmun | May 11, 1943 |
| 2,379,757 | Smith | July 3, 1945 |
| 2,416,613 | Costin | Feb. 25, 1947 |
| 2,431,361 | Athy | Nov. 25, 1947 |
| 2,493,992 | Murphy et al. | Jan. 10, 1950 |
| 2,539,435 | Kirby | Jan. 30, 1951 |
| 2,595,632 | Bivings et al. | May 6, 1952 |